United States Patent [19]
Ito et al.

[11] 3,784,793
[45] Jan. 8, 1974

[54] CARD READER DEVICE

[75] Inventors: Katsunori Ito; Shinichiro Imai, both of Kariya, Japan

[73] Assignee: Nippondenso Co., Ltd., Kariya, Japan

[22] Filed: Dec. 20, 1971

[21] Appl. No.: 209,656

[30] Foreign Application Priority Data
Dec. 25, 1970 Japan ............................ 45/125613

[52] U.S. Cl... 235/61.11 D, 179/90 CS, 179/6.3 CC
[51] Int. Cl. ...... H04j 3/08, H04m 1/48, G06k 7/08
[58] Field of Search................. 179/90 CS, 15 AL, 179/100.2 MD, 6.3 CC; 235/61.11 E, 61.11 D; 340/174.1 H, 147

[56] References Cited
UNITED STATES PATENTS

| | | | |
|---|---|---|---|
| 3,022,381 | 2/1962 | Pferd | 179/6.3 CC |
| 3,588,365 | 6/1971 | McNeilly et al. | 179/15 AL |
| 3,596,003 | 7/1971 | Poli | 179/90 CS |

*Primary Examiner*—Thomas A. Robinson
*Attorney*—Cushman et al.

[57] ABSTRACT

A card reader device for use in a data communication apparatus such as a wire telephone or a radiotelephony equipment, which device can have one or more number cards storing subscribers' numbers set therein, select a desired number card optionally, and read out the number code of the selected card, the data communication apparatus being furnished with no particular number code which identifies the apparatus so that the apparatus may be utilized by many unspecified subscribers.

8 Claims, 8 Drawing Figures

INVENTOR

Katsunori ITO
Shinichiro IMAI

Cushman, Darby & Cushman

BY

ATTORNEY

INVENTOR
Katsunori ITO
Shinichiro IMAI
Cushman, Darby & Cushman
BY
ATTORNEY

INVENTOR
Katsunori ITO
Shinichiro IMAI
Cushman, Darby & Cushman
BY
ATTORNEY

INVENTOR
Katsunori ITO
Shinichiro IMAI
BY Cushman, Darby + Cushman
ATTORNEY

CARD READER DEVICE

BACKGROUND OF THE INVENTION

1. Field of the Invention

The present invention relates to a card reader device for use in a data communication apparatus such as a wire telephone system or a radiotelephony equipment, which device can have one or more number cards storing subscribers' numbers set therein, can select a desired number card, if necessary, and read out the number code of the selected card, the data communication apparatus being furnished with no particular number code which identifies the apparatus so that the apparatus may be utilized by many unspecified subscribers.

2. Description of the Prior Art

The conventional communication apparatus is usually furnished with a particular number code characteristic of the apparatus itself. Therefore, there is a problem in that communication will be impossible when a subscriber pertaining to the communication moves from a place where the specified communication apparatus is installed to another

SUMMARY OF THE INVENTION

The object of the invention is to provide a card reader device comprising reader circuits for reading out the number codes of number cards, amplifier circuits for amplifying the outputs of the reader circuits, card selector switch circuits for selecting a desired one of the number cards, logical product, i.e. "NAND" circuits, logical sum, i.e., "NOR" circuits, and memory circuits, wherein the selection of a desired card and the reading of the code of the selected card are performed by the card selector switch circuit and the read code is then stored in the memory circuit.

According to the present invention, as will be apparent from the following description and the attached drawings, the card reader device is constituted of reader circuits, amplifier circuits, card selector switch circuits, NAND circuits, NOR circuits, and memory circuits. Therefore, a communication apparatus provided with the card reader device according to the present invention can be used by many unspecified subscribers without being furnished with any identification number code proper to the conventional communication apparatus of a similar kind. If a subscriber wants to communicate with other subscribers, he has only to set a desired number card in the card reader device incorporated in a communication apparatus which is constructed according to the invention and which is installed where he happens to be.

DESCRIPTION OF THE PREFERRED EMBODIMENT

Figure 1:
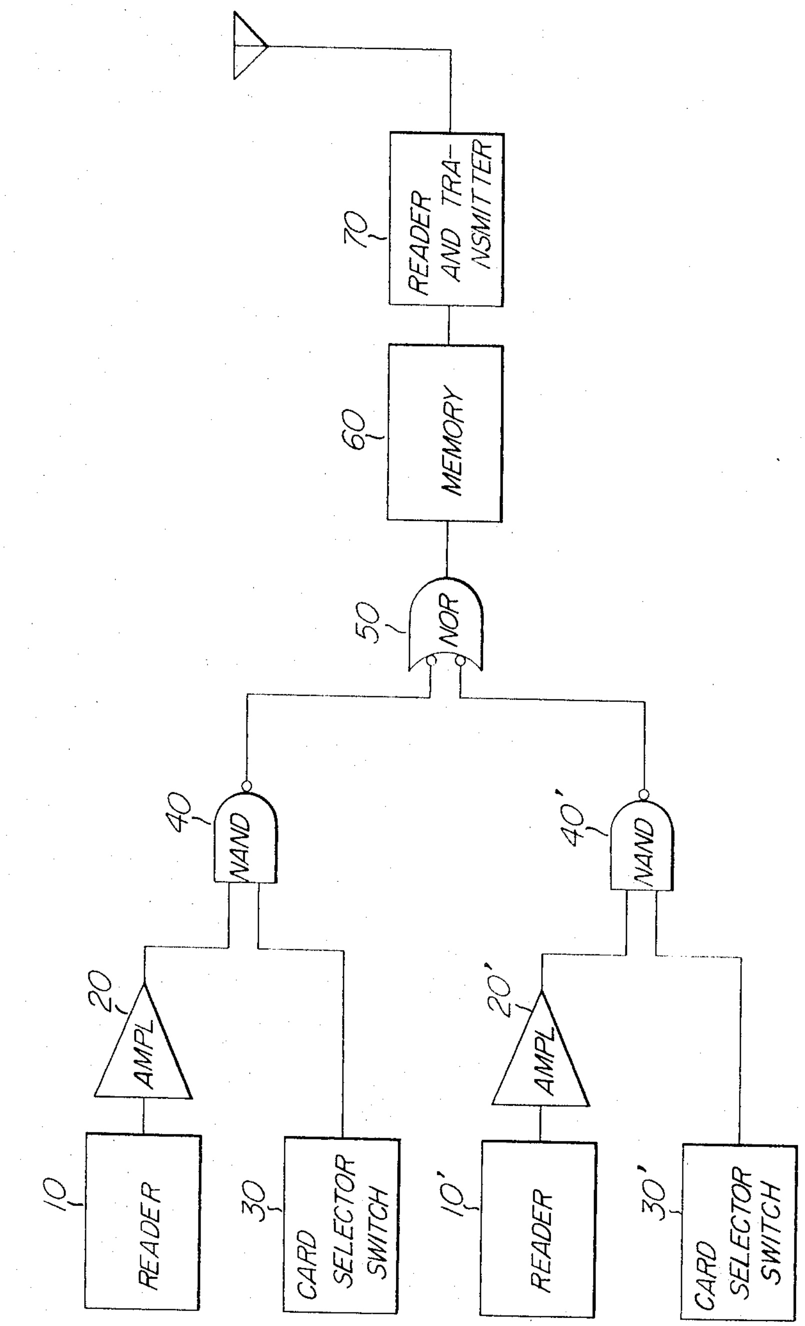
FIG. 1 is a block diagram of one embodiment of the card reader device according to the invention.

One embodiment of the present invention will now be described in conjunction with the corresponding figures of the drawings. FIG. 1 is a block diagram showing a schematic circuit arrangement of a device according to the invention, which is adapted for selecting among two number cards and reading the number codes thereof. In FIG. 1, numerals 10 and 10' indicate respectively reader circuits which read the numbers of the number cards; 20 and 20' amplifier circuits which amplify the output of the readers 10 and 10' respectively; 30 and 30' card selector switch circuits which select from among number cards; 40 and 40' logical product or "NAND" circuits; 50 a logical sum or "NOR" circuit; 60 a memory circuit; and 70 a code transmitter which reads out the number codes stored in the memory 60 and transmits the read-out number codes on a transmission wire or on a radio wave.

The output of the reader circuit 10 is connected with the input of the amplifier circuit 20 and the output of the amplifier 20 is in turn connected with one of the inputs of the NAND circuit 40. On the other hand, the output of the card selector switch circuit 30 is connected with the other input of the NAND circuit 40. In like manner, the output of the reader circuit 10' is connected with the input of the amplifier 20', the output of which is then connected with one of the inputs of the NAND circuit 40', and the output of the card selector switch circuit 30' is connected with the other input of the NAND circuit 40'. The output of the NAND circuit 40 is connected with one of the inputs of the NOR circuit 50 while the output of the NOR circuit 40' is fed to the other input of the NOR circuit 50. The output of the NOR circuit 50 is connected with the input of the memory circuit 60, the output of which is then connected with the input of the code transmitter 70 which reads out the stored number codes in the memory 60 and thereby modulates a carrier wave to be transmitted.

The constitutions and operations of the above mentioned individual circuit elements will next be described. The reader circuits 10 and 10' detect the number codes stored in any number card electrically or magnetically and then convert the detected codes into corresponding binary codes. The amplifier circuits 20 and 20' respectively amplify the signals from the readers 10 and 10' and shape the wave form of the amplified signals. The card selector switches 30 and 30' select any desired number card and send to the receiving end information of the fact that the communication device is being operated by the card or display the same fact.

Figure 2:
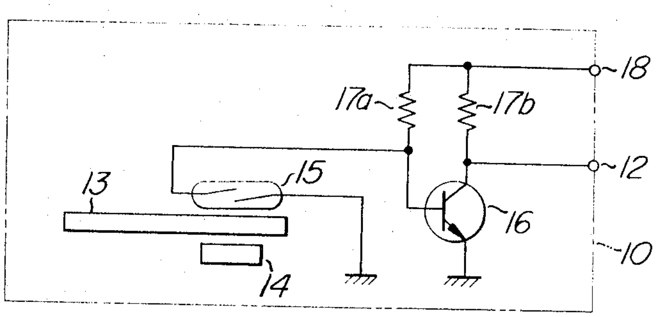
FIG. 2 is an electric connection diagram of the reader circuit of the card reader device.

FIG. 2 shows the constitution in detail of one embodiment of the reader circuits 10 and 10' which are equivalent to each other in function and structure. In FIG. 2, numeral 12 designates an output terminal; 13 a number card; 14 a permanent magnet; and 15 a reed switch. The permanent magnet 14 and the reed switch 15 are arranged in opposite relation to each other and the number card 13 is interposed between the magnet 14 and the switch 15. One end of the reed switch 15 is grounded and the other end of the reed switch 15 is connected with one end of a resistor 17*a* and also with the base of a transistor 16. The other end of the resistor 17*a* is connected with a power voltage supply terminal 18. The emitter of the transistor 16 is grounded and the collector of the transistor 16 is coupled to a terminal which forms an output terminal 12 of the reader circuit 10 or 10' and also to one end of a resistor 17*b*. The other end of the resistor 17*b* is coupled to the power terminal 18. The operation of the reader circuit described above is as follows. The actuation of the reed switch 15 is controlled by inserting the number card 13 between the permanent magnet 14 and the reed switch 15. The output terminal of the reader circuit 10 is controlled by controlling the base supply for transistor 16. Reed switch 15 controls the base flow to the base supply of transistor 16 via resistor 17*a*. Assuming that the reed switch 15 is closed with the number card 13 interposed between the magnet 14 and the reed switch 15, a current from the power supply terminal 18 will be led to the ground potential through the resistor 17*a* and the contacts of the reed switch 15. As a result, the base current of the transistor 16 is cut off so that the transistor 16 turns off. Accordingly, the same voltage as that at the terminal 18 will appear via the resistor 17*b* at the collector of the transistor 16, i.e., the output terminal 12 of the reader circuit 10. On the other hand, where the contacts of the reed switch 15 are open with the card 13 interposed between the magnet 14 and the switch 15, a current from the power supply terminal 18 will not be conducted through the resistor 17*a* and the contacts of the reed switch 15. Therefore, the current will be led to earth potential through the resistor 17*a* and the base of the transistor 16 so that the transistor 16 will be conductive. Consequently, the collector of the transistor 16, i.e., the output terminal 12 of the reader circuit 10 is grounded via a path established between the emitter and collector of the transistor 16 since a current flows from the power supply terminal 18 to the earth potential through the resistor 17*b* and the path. Therefore, no voltage will appear at the terminal 12. Namely, the reader circuit 10 is a circuit which electrically or magnetically detects the signal stored in the number card and converts the thus detected signals into corresponding electric ones. It should be noted that the permanent magnet and the reed switch can be replaced by a combination of magnetic tape and read head or by a combination of light source and photosensitive element. In this latter case, of course, such a combination does not depart from the spirit of the invention. The constitution and operation of the reader circuit 10' are identical with those of the reader circuit 10 described with reference to FIG. 2.

Figure 3:
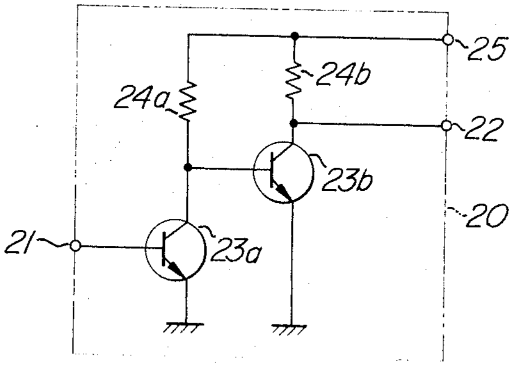
FIG. 3 is an electric connection diagram of the amplifier circuit of the card reader device.

The practical circuit arrangement of the amplifier 20 is shown in FIG. 3. An input terminal 21 is connected with the output terminal 12 of the reader circuit 10. An output terminal of the amplifier circuit is designated by numeral 22. The base of a transistor 23*a* is connected with the input terminal 21, and the emitter of the transistor 23*a* is grounded while its collector is connected with one end of a resistor 24*a* and also with the base of a transistor 23*b*. The other end of the resistor 24*a* is connected with a power voltage supply terminal 25. The emitter of the transistor 23*b* is grounded while the collector thereof is connected with a terminal 22 which forms the output terminal of the amplifier circuit 20 and also with one end of a resistor 24*b*. The other end of the resistor 24*b* is coupled to the power supply terminal 25. The operation of the amplifier circuit described above is as follows. When a voltage is applied to the input terminal 21 of the amplifier 20, current flows between the base and emitter of the transistor 23*a* to render the same conductive. As a result, a current will flow from the power supply terminal 25 to the earth potential through the resistor 24*a* and the emitter-collector path of the transistor 23*a* established due to the base current. Therefore, the voltage at the base of the transistor 23*b* falls to zero so that the transistor 23*b* turns non-conductive, whereby the same potential as that at the power supply terminal 25 will appear via the resistor 24*b* at the collector of the transistor 23*b* and therefore at the terminal 22 which is the output of the amplifier 20.

On the other hand, when there is no voltage applied to the input terminal 21, the base of the transistor 23*a* draws no current so that the transistor 23*a* is non-conductive. As a result, the same potential as that at the terminal 25 will appear at the collector of the transistor 23*a* through the resistor 24*a*, whereby a current will flow between the base and the emitter of the transistor 23*b* to render the same conductive. Accordingly, a current flows from the power supply terminal 25 to the earth potential through the resistor 24*b* and the emitter-collector path of the transistor 23*b* established due to the base current. Therefore, the resistance between the collector of the transistor 23*b*, i.e., the output terminal 22 and the earth potential vanishes so that there is no voltage appearing—zero signal appears—between the terminal 22 and the earth potential. The constitution and operation of the amplifier circuit 20' are identical with those of the amplifier 20 described above in FIG. 3.

Figure 4:
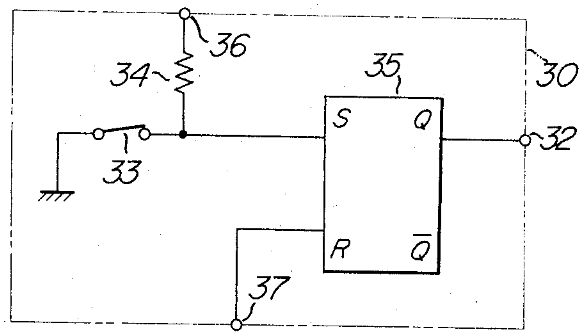
FIG. 4 is an electric connection diagram of the card selector switch circuit of the card reader device.

The practical arrangement of the card selector switch circuit 30 is shown in FIG. 4, in which one end of a switch 33 is grounded while the other end thereof is connected with one end of a resistor 34 and also with the set terminal S of a well-known flip-flop circuit 35 (power supply terminal omitted), and the other end of the resistor 34 is connected with a power voltage supply terminal 36. The reset terminal R of the flip-flop 35 is connected with a reset signal input terminal 37, and the output terminal Q of the flip-flop 35 is connected with a selector signal output terminal 32 to serve as the output terminal of the card selector switch circuit 30.

The operation of the card selector switch circuit 30 having such an arrangement as described above is as follows. When the contacts of the switch 33 are open, a voltage from the power supply terminal 36 is applied to the set terminal S of the flip-flop 35 through the resistor 34. In this case, zero signal is being applied to the reset signal input terminal 37 and the flip-flop 35 is already in its reset state. Therefore, zero signal exists at the output terminal Q of the flip-flop 35.

On the other hand, when the contacts of the switch 33 are closed, the power supply terminal 36 is grounded through the resistor 34 so that zero signal is applied to the set terminal S of the flip-flop 35. Consequently, the flip-flop 35, which was previously in its reset state, is inverted to its set state so that a signal (voltage) appears at the output terminal Q of the flpflop 35, whereby a signal (voltage) appears at the selector signal output terminal 32. The signal to be applied to the reset signal input terminal 37 is so appropriately chosen that not only such a zero signal as mentioned is applied to the flip-flop 35 for a certain period of time to reset the flip-flop 35 when the switch 33 is closed but also the zero signal is still being applied even at the time when the transmission of the number code of a selected number card stored in the memory circuit 60 through the transmitter is completed in order to enable the next number to be selected. The arrangement and operation of the card selector switch circuit 30' is identical with that of the card selector switch circuit 30 shown in FIG. 4.

Figure 5:
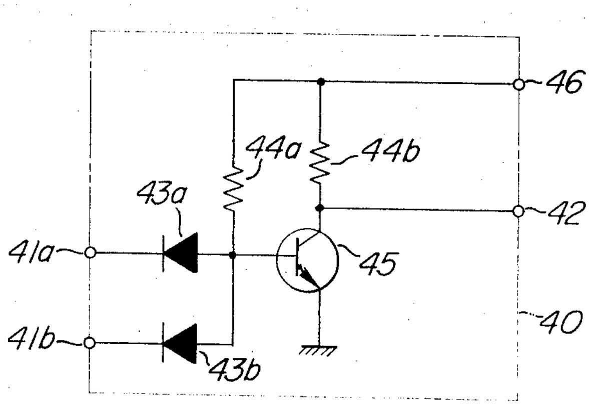
FIG. 5 is an electric connection diagram of the NAND circuit of the card reader device.

The practical arrangement of the NAND circuit 40 is, for example, shown in FIG. 5. In this figure, numeral 41*a* indicates one of the input terminals of the NAND circuit 40, and the terminal 41*a* is connected with the cathode of a diode 43*a*. The other input terminal of the NAND circuit 40 is designated at numeral 41*b*, and this input terminal is connected with the cathode of another diode 43*b*. The anodes of the diodes 43*a* and 43*b* are connected together with one end of a resistor 44*a* and with the base of a transistor 45. The other end of the resistor 44*a* is connected with a power supply terminal 46. The emitter of the transistor 45 is grounded while the collector thereof is coupled to one end of a resistor 44*b* and also to an output terminal 42. The other end of the resistor 44*b* is connected with the power supply terminal 46.

The operation of the NAND circuit 40 having such a constitution as described above is as follows. When a zero signal is applied to the input terminal 41*a*, a current flows from the power supply terminal 46 to the input terminal 41*a* through the resistor 44*a* and the diode 43*a*. Accordingly, the potential at the anode of the diode 43*a*, i.e., the potential at the base of the transistor 45, falls to zero so that the transistor 45 turns non-conductive. Similarly, when a zero signal is applied to the input terminal 41*b*, a current flows from the power supply terminal 46 to the input terminal 41*b* through the resistor 44*a* and the diode 43*b*. Accordingly, the potential at the anode of the diode 43*b*, i.e., the potential at the base of the transistor 45, falls to zero so that the transistor 45 turns non-conductive. When the transistor 45 is non-conductive, the potential at the power supply terminal 46 will appear at the collector of the transistor 45 through the resistor 44*b*. Thus, a voltage will appear at the output terminal 42.

On the other hand, when voltages higher than a certain constant level are applied to both the input terminals 41*a* and 41*b*, a voltage is applied from the power supply terminal 46 through the resistor 44*a* to the base of the transistor 45. Consequently, a current flows between the base and emitter of the transistor 45 so that the transistor 45 turns conductive. Therefore, a current path is established between the terminal 46 and the earth potential through the resistor 44*b* and the emitter-collector path of the transistor 45 so that a zero signal is produced as an output at the output terminal 42. To sum up, a voltage will appear at the output terminal 42 if a zero signal is applied to any one of the input terminals 41*a* and 41*b*, whereas a zero signal will appear at the output terminal 42 only if certain constant voltages are applied to both the input terminals 41*a* and 41*b*. The constitution and operation of the NAND circuit 40' are identical with those of the NAND circuit 40 as shown in FIG. 5.

Figure 6:
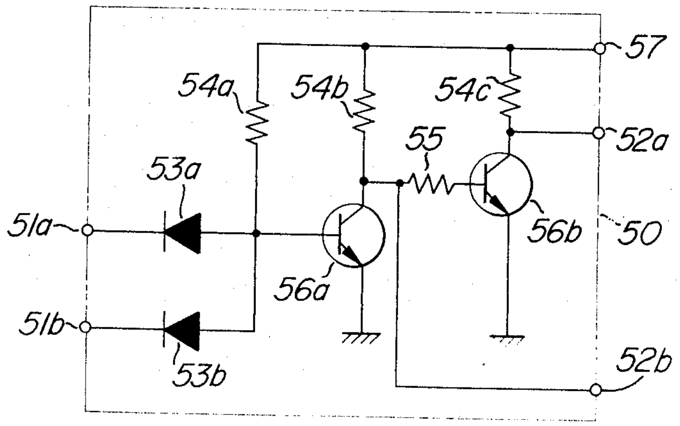
FIG. 6 is an electric connection diagram of the nOR circuit of the card reader device.

The exemplary circuit arrangement of the NOR circuit 50 is shown in FIG. 6. In this figure, numeral 51*a* indicates one of the input terminals of the NOR circuit 50, which is connected with the cathode of a diode 53*a*, and numeral 51*b* designates the other of the input terminals of the NOR circuit 50, which is coupled to the cathode of a diode 53*b*. The anodes of the diodes 53*a* and 53*b* are connected together and coupled to one end of a resistor 54*a* and also to the base of a transistor 56*a*. The other end of the resistor 54*a* is connected with a power supply terminal 57. The emitter of the transistor 56*a* is grounded while the collector thereof is connected with one end of a resistor 54*b*, one end of a resistor 55, and an output terminal 52*b*. The other end of the resistor 54*b* is connected with the power supply terminal 57 and the other end of the resistor 55 is connected with the base of a transistor 56*b*. The emitter of the transistor 56*b* is grounded while the collector thereof is connected with one end of a resistor 54*c* and an output terminal 52*a*. The other end of the resistor 54*c* is connected with the power supply terminal 57. The operation of the NOR circuit 50 having such a constitution as described above is as follows. When a zero signal is applied to the input terminal 51*a*, a current flows from the power supply terminal 57 to the input terminal 51*a* at zero potential through the resistor 54*a* and the diode 53*a*. Consequently, the potential at the anode of the diode 51*a*, i.e., at the base of the transistor 56*a*, falls to zero so that the transistor 56*a* turns non-conductive. Similarly, when a zero signal is applied to the input terminal 51*b*, a current flows from the power supply terminal 57 to the input terminal 51*b* at zero potential through the resistor 54*a* and the diode 53*b*. Consequently, the potential at the anode of the diode 53*b*, i.e., at the base of the transistor 56*a*, falls to zero so that the transistor 56*a* turns non-conductive. When the transistor 56*a* is cut off, the potential at the power supply terminal 57 will appear at the collector of the transistor 56*a* through the resistor 54*b*. As a result, a voltage will appear at the output terminal 52*b*. Also, according to the voltage appearing at the collector of the transistor 56*a*, a current is led to the earth potential through the resistor 55 and the base and emitter of the transistor 56*b* so that the transistor 56*b* turns conductive. When the transistor 56*b* is conductive, a current flows from the power supply terminal 57 to the earth potential through the resistor 54*c* and the collector and emitter of the transistor 56*b*. Consequently, the potential at the collector of the transistor 56*b* falls to zero so that a zero signal will appear as an output signal at the output terminal 52*a*. On the other hand, when certain voltages higher than a constant level are applied to both the input terminals 51*a* and 51*b*, a voltage from the power supply terminal 57 is applied to the base of the transistor 56*a* through the resistor 54*a*, whereby a base current will flow between the base and emitter of the transistor 56*a* so that the transistor 56*a* turns conductive. Consequently, a current flows from the terminal 57 to the earth potential through the resistor 54*b* and the collector and emitter of the transistor 56*a* so that a zero signal will appear as an output at the output terminal 52*b*. Accordingly, the potential at the base of the transistor 56*b*, which is connected with the collector of the transistor 56*a* through the resistor 55, falls to zero, and therefore the transistor 56*b* turns non-conductive since no current flows between the base and emitter of the transistor 56*b*. Then, the potential at the power supply terminal 57 will appear via the resistor 54*c* at the collector of the transistor 56*b* and therefore a voltage will appear as an output at the output terminal 52*a*. Namely, when a zero signal is applied to any one of the input terminals 51$a$ and 51$b$ a zero signal will appear at the output terminal 52$a$ and a voltage having a constant level will appear at the output terminal 52$b$, whereas when certain constant voltages are applied to both the input terminals 51$a$ and 51$b$ a voltage having a constant level will appear at the output terminal 52$a$ and a zero signal will appear at the output terminal 52$b$.

Figure 7:
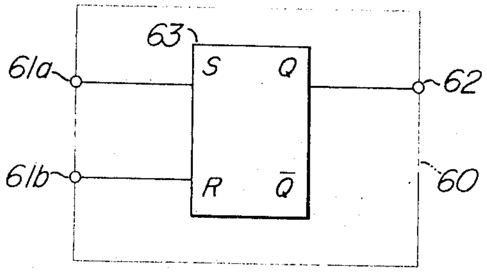
FIG. 7 is an electric connection diagram of the memory circuit of the reader device.

The schematic arrangement of the memory circuit 60 is shown in FIG. 7. In this figure, numeral 61$a$ indicates a set input terminal of a well-known flip-flop (power supply terminal omitted) 63; 61$b$ a reset input terminal of the flip-flop 63; and 62 an output terminal of the memory circuit 60.

The operation of the memory circuit 60 is as follows. When a zero signal is applied to the input terminal 61$a$, a constant voltage will appear at the output terminal 62 (in this case, however, it is assumed that a constant voltage is being applied to the input terminal 61$b$). On the other hand, when a zero signal is applied to the input terminal 61$b$, a zero signal will appear at the output terminal 62 (in this case, it is also assumed that a constant voltage is being applied to the input terminal 61$a$).

The structural details of the transmitter 70 are not illustrated herein. The transmitter 70 receives the output from the memory circuit 60, thereby modulates a carrier wave and transmits the modulated carrier wave to the receiving end through a transmission line or on a radio wave.

In the foregoing description, the device according to the invention is explained in case where only two number cards, each carrying thereon a number code consisting of only one digit, is used. The reader circuit 10 and the card selector switch circuit 30 are associated with the single digit code of one of the two cards while the reader circuit 10′ and the card selector switch circuit 30′ are associated with the single digit code of the other card.

The overall operation of the device according to the invention will now be described in the following, where only the card selector switch circuit 30 is actuated, that is, the reader circuit 10 alone detects the number code of the associated number card and the number code is transmitted through the transmitter 70 to the receiving end. If a number card with a number code stored therein is set in the reader 10, that is, the card is interposed between the reed switch 15 and the permanent magnet 14, then the code is read out by the reader 10, the output of which is in turn applied to the amplifier 20 to be amplified. The output of the amplifier 20 is then fed to the NAND circuit 40. At the same time, by actuating the switch 33 of the selector switch 30, the switch 30 delivers an output signal which is also fed to the NAND circuit 30. Consequently, the NAND circuit 40 produces an output signal, which is applied to the NOR circuit 50 to enable it to deliver an output which is received by the memory circuit 60 to be memorized therein. The output signal of the memory circuit 60 is then applied to the transmitter 70 and the transmitter 70 transmits to the receiving end the read-out number code of the card set in the reader 10.

Figure 8:
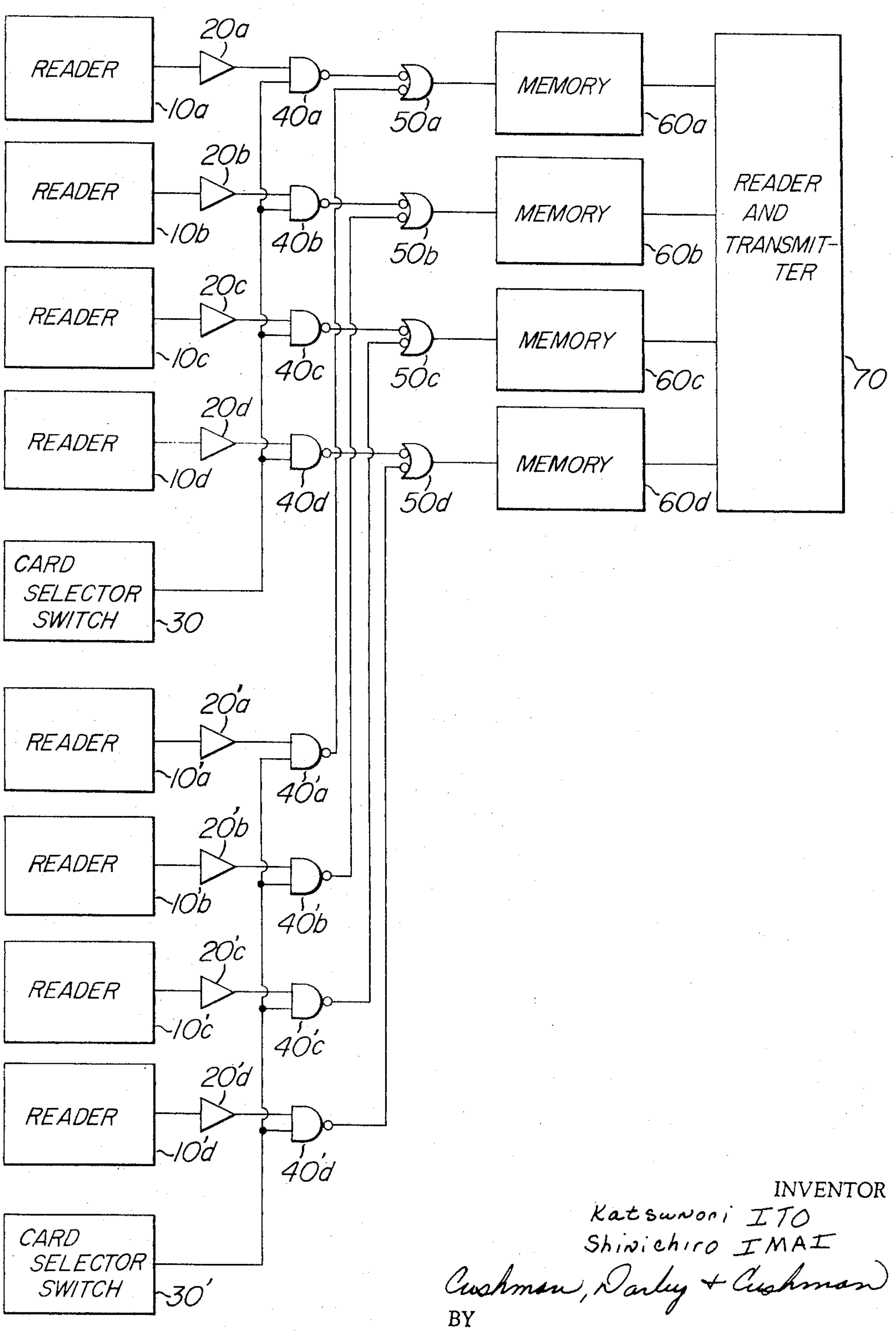
FIG. 8 is a block diagram of another embodiment of the card reader device according to the invention.

In the embodiment of the invention described above only one reader circuit is employed for an individual card since it is assumed that each card has a single digit code to be read out. However, it should be noted that the present invention can be easily applied with a slight modification to the case where a plurality of number cards are used and each card has a multi-digit number code. For example, a modified embodiment of the invention is shown in FIG. 8, which employs two groups of readers circuits: 10$a$, 10$b$, 10$c$, 10$d$, 10′$a$, 10′$b$, 10′$c$ and 10′$d$, and which shows a case where two number cards are to be read out. In FIG. 8, numerals 10$a$ – 10$d$, and 10′$a$ – 10′$d$ indicate reader circuits; 20$a$ – 20$d$, and 20′$a$ – 20′$d$ amplifier circuits associated respectively with the reader circuits; 30 and 30′ card selector switch circuits; 40$a$ – 40 $d$, and 40′$a$ – 40′$d$ logical product circuits, i.e., NAND circuits; 50$a$ – 50$d$ logical sum circuits, i.e., NOR circuits; 60$a$ – 60$d$ memory circuits; and 70 a code transmitter which reads out the number codes stored in the memory circuits 60$a$ – 60$d$ and sequentially transmits the read-out number codes. Each circuit element of the device shown in FIG. 8 is identical with that of the previously described embodiment. Also, the operation of the device shown in FIG. 8 will be easily understood from the foregoing description. When, for example, the card selector switch 30 is energized with the other selector switch left deenergized, the readers 10$a$ – 10$d$ will read out the number codes of the associated card, and the read-out codes are stored in the corresponding memory circuits 60$a$ – 60$d$ through amplifiers 20$a$ – 20$d$, NAND circuits 40$a$ – 40$d$, and NOR circuits 50$a$ – 50$d$, respectively. Finally, the number codes read out sequentially by the readers 10$a$, 10$b$, 10$c$, 10$d$ are transmitted from the transmitter 70 in the same order as mentioned above.

We claim:

1. A device for reading the number code of a selected one of a plurality of number cards for use in a subscriber telephone system comprising;

a plurality of reader circuits for detecting the code number in a corresponding plurality of number cards and for producing a signal corresponding to the respective code number of the card selected, a card selector switch circuit for selecting a card to be read, gate means enabled by said card selector switch circuit for delivering the signal output of the reader circuit selected by said card selector switch, and a memory circuit connected to said gate circuit for storing the output signal from said selected reader circuit.

2. The device according to claim 1, wherein said reader circuits include proximity switch means responsive to the proximity of said card for producing a signal in accordance with said stored code of said number card.

3. The device according to claim 2, wherein said proximity switch includes a reed switch and permanent magnet adjacent thereto, said reed switch affected to assume an open or closed state in accordance with the code stored in said number card when said card is interposed between said reed switch and permanent magnet.

4. The device according to claim 3, wherein said number card has a plurality of stored number codes therein and there is provided a corresponding plutality of proximity switch means for each of said numbers.

5. The device according to claim 1, wherein said gate of said card selector circuit is a NAND gate having an input controlled by said bistable means and its other gate controlled by the output of said card reader means.

6. The device according to claim 1 further including: NOR gate means responsive to outputs of said reader circuits and associated card selector switch circuits said NOR gate means for selectively gating only one of the outputs of said circuits at a time.

7. The device according to claim 1, wherein said memory circuit comprises: bistable means responsive to inputs of said reader and selector switch circuits, having at least two states for storing said inputs.

8. The device according to claim 7, wherein there is provided a memory circuit for each of a plurality of code numbers stored in said card for storing each of said code numbers for transmission.

* * * * *